united States Patent Office 2,947,335
Patented Aug. 2, 1960

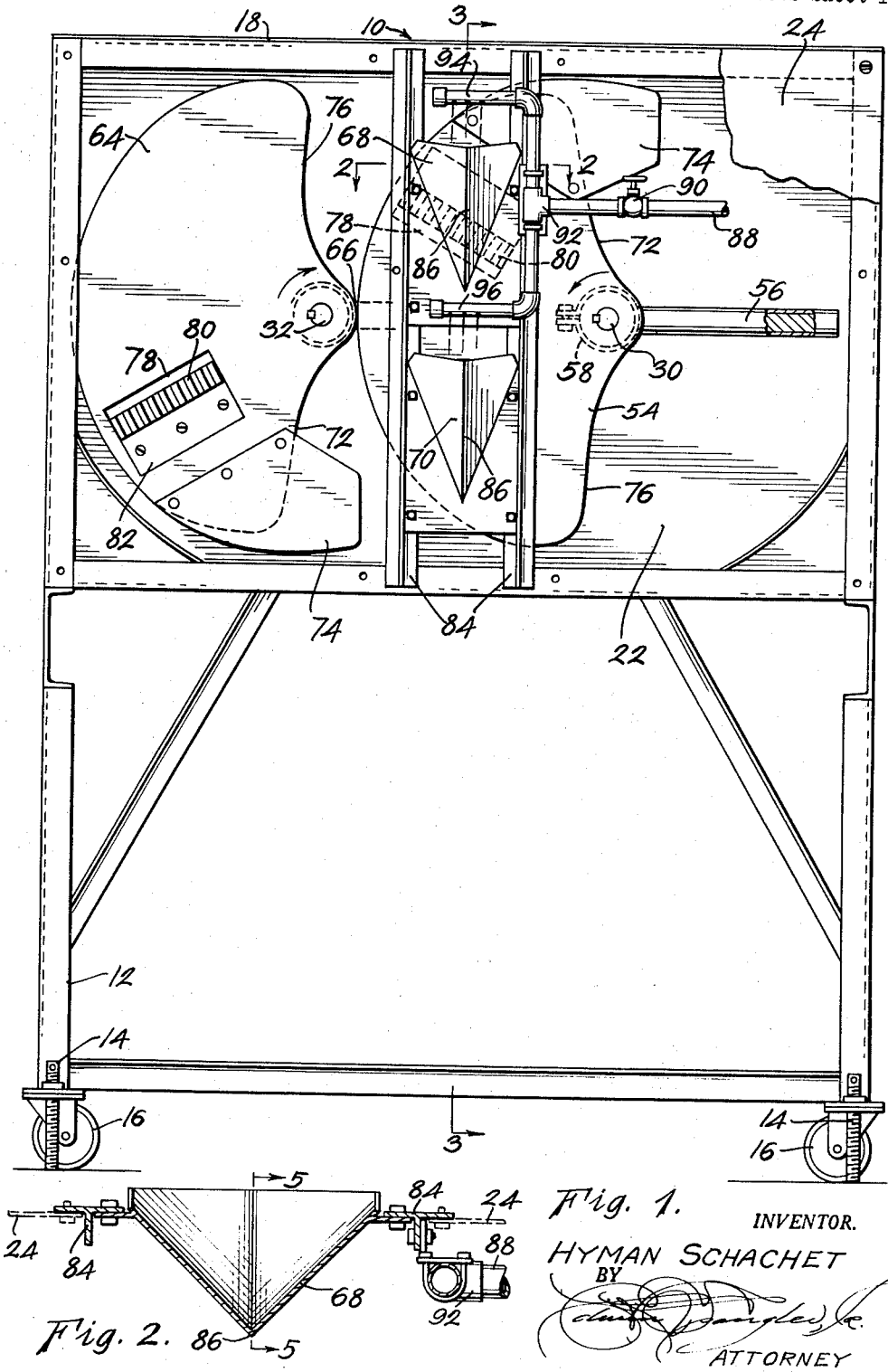

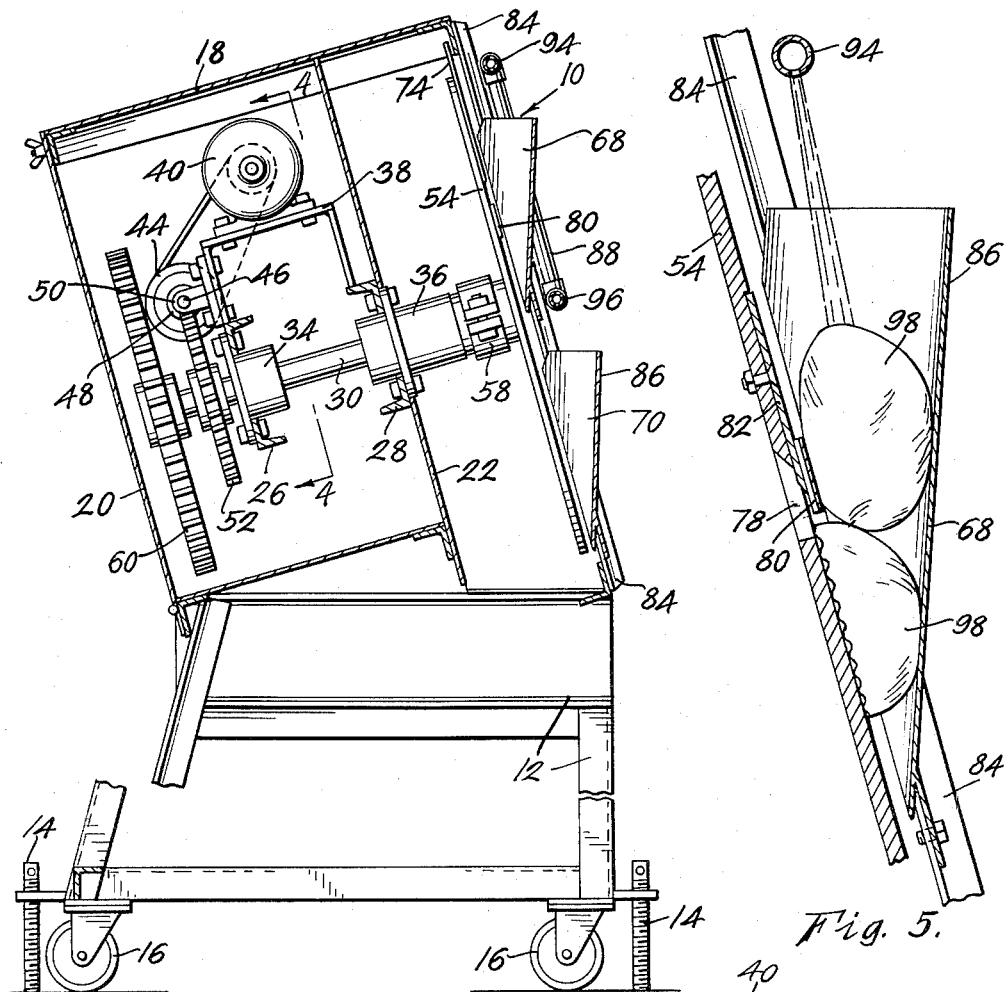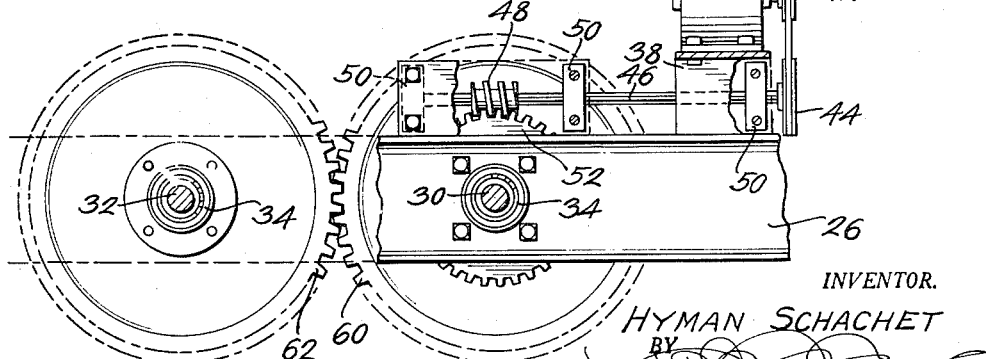

2,947,335

CORRUGATED POTATO CHIP MACHINE

Hyman Schachet, 1020 Larimer St., Denver, Colo.

Filed Dec. 16, 1957, Ser. No. 703,091

2 Claims. (Cl. 146—78)

This invention relates to improvements in vegetable slicing machines of the general type shown in my copending applications S.N. 473,933 now United States Patent No. 2,818,897 and S.N. 553,630 now United States Patent No. 2,818,898.

One of the most difficult problems in the design of a vegetable slicing machine is to provide a construction that will produce a uniform product at a high rate of speed. In potato chip machines, in particular, the feed mechanism must be such that slices of uniform thickness are produced rather than wedge-shaped slices which are unsightly in appearance and do not cook evenly. Along the same line, waffle-type chip machines that do not produce a slice of uniform thickness result in a product that may have no holes or interstices between the corrugations or any number of other odd looking chips.

Although certain types of continuously hand-fed machines overcome the foregoing objection, they are generally much too slow for large-scale commercial operation which requires a machine that can handle a minimum of five hundred pounds of vegetables per hour, and preferably, over two thousand pounds per hour.

Another difficulty with the feed mechanisms of the prior art machines is that they require vegetables to be used therein of a relatively uniform size and shape. This, of course, necessitates careful grading and selection of the vegetables to be fed into the machine.

It is, therefore, the principal object of the present invention to provide a vegetable slicing machine incorporating an improved feed mechanism.

A second object is the provision of a vegetable slicer that produces slices of uniform thickness.

Another object is to provide a slicing machine capable of high-speed commercial operation.

Still another object is the provision of a vegetable slicing machine that can be hand-fed rapidly or used in conjunction with conventional automatic feeders such as conveyors and hoppers.

An additional object of the invention is to provide a vegetable slicer that does not require vegetables of a uniform size and shape to be fed therein.

Further objects are to provide a vegetable slicer that is rugged, compact, simple to construct and operate, and one that is relatively inexpensive.

Other objects will be in part apparent and in part pointed out specifically hereinafter in connection with the description of the drawing that follows, in which:

Figure 1 is a front elevation of the vegetable slicing machine of the present invention with the face plate removed to expose the interior;

Figure 2 is a fragmentary section to an enlarged scale taken along line 2—2 of Figure 1;

Figure 3 is a section taken along line 3—3 of Figure 1, portions of the supporting frame having been broken away to conserve space;

Figure 4 is a fragmentary section taken along line 4—4 of Figure 3; and,

Figure 5 is a section taken along line 5—5 of Figure 2.

Referring now to the drawing, and in particular to Figures 1 and 3 thereof, it will be seen that the slicing mechanism of the present invention, indicated in a general way by numeral 10, is supported in rearwardly inclined position on a wheeled-frame 12. Bolts 14 are threaded through the lower corners of the frame and function to raise the wheels 16 off the floor in order to maintain the machine in a fixed location. The slicing mechanism 10 is located within a housing 18 having a hinged rear panel 20 and a fixed intermediate partition 22. The housing also includes removable front cover plates 24 shown most clearly by dotted lines in Figure 2.

The drive mechanism for the slicer, which is shown most clearly in Figures 1 and 2, is supported within the housing and between the intermediate and rear panels thereof, by spaced channels 26 and 28 extending between the side walls, not shown. Driven shafts 30 and 32 are journalled for rotation in transversely spaced parallel relation within conventional bearing assemblies 34 and 36 carried by the channels. Motor mounting bracket 38 is supported between the channels and carries electric motor 40 which includes drive pulley 42. A power shaft 46, carrying driven pulley 44 connected by a belt to the drive pulley and a worm gear 48, is journalled for rotation within shaft bearings 50 mounted on the channels. Worm 48 meshes with worm gear 52 mounted on driven shaft 30 to rotate said shaft and cutter disk 54 keyed to the front end thereof. The cutter disk 54 is substantially semi-circular and requires a counterweight 56 to be attached to the shaft by clamp 58 to correct for the out-of-balance condition. The rear end of shaft 30 is provided with a spur gear 60 that meshes with an identical gear 62 carried by shaft 32 and which functions as a drive therefor. A second cutter disk 64 is keyed to the forward end of shaft 32 in co-planar relation with disk 54. Disk 64 is likewise provided with a counterweight 66. The gearing is such that the cutter disks rotate in opposite directions as indicated by the arrows in Figure 1.

With particular reference to Figures 1 and 5, it will be noted that the driven shafts 30 and 32 are located approximately equidistant on opposite sides of the vertically spaced, upper and lower feed chutes 68 and 70 in the front of the housing. The shape of the cutter disks 54 and 64 is such that they miss one another as they rotate in opposite directions across the discharge ends of the feed chutes even though the disks are arranged in coplanar relation. The trailing edge 72 of each disk is, however, provided with a plate-like extension 74 that overlaps the leading edge 76 of the other disk at the point where both blades pass across the discharge ends of the feed chutes one-behind-the-other in order to keep the chutes blocked at all times during the operating cycle. Both disks contain an aperture 78 located to pass across the discharge ends of both feed chutes as the disks rotate. In the particular embodiment of the invention illustrated herein, the cutters 80 are designed to produce so-called "waffle chips" and are, therefore, of a corrugated cross section although it is apparent that other cutter designs could also be used. Each cutter 80 is mounted on an adjustable bed-plate 82 in position to project part way across aperture 78 and cut across the discharge ends of both feed chutes in directions which are approximately at right angles to one another. Thus, the cutters on the two disks 54 and 64 cooperate with one another to produce a slice from a vegetable in each feed chute which has corrugations on opposite sides that intersect at angles of about 90° although the particular angle is not at all critical. Both cutters, of course, slice both vegetables once during each revolution.

With reference now in particular to Figures 1, 2, 3 and 5, it will be seen that the feed chutes 68 and 70 are detachably mounted on the substantially vertical center line of the front of the housing between spaced uprights 84. Each chute has a V-shaped cross section defined by side-walls which converge to form a common edge 86 inclined at an angle of less than 45° to the plane of disks 54 and 64 and the cutters. Also, the angle between the side-walls of the chutes is preferably greater than 60° or approximately a right angle as shown in Figure 2. The small incline of the chutes relative to the disks is a very important feature of the present invention as it results in a wedging-action that forces the vegetable tightly against the cutters. The angle between the edge 86 and the disks is preferably between approximately 30° and 40°. The wide angle between the sides of the chutes also assists in the feeding operation as the vegetables contact the chute at points almost directly opposite the cutters rather than on the sides where it would have little tendency to hold them against the disks. Note further that the disks are tilted slightly upward so the vegetables have a tendency to gravitate against the cutters.

Perhaps the most important feature of the present invention is the construction by which the vegetables are fed into the chutes against the cutters. A water line 88 including a valve 90 is branched at T-connection 92 which is connected to the front of the housing. From the T-fitting emanate upper and lower spray nozzles 94 and 96 which are located immediately above the corresponding chutes. Each nozzle is closed at the end and apertured to direct one or more jets of water into its chute. The spray impinges upon one or more vegetables 98 placed in the chute which forces them against the disks and cutters carried thereby. The vegetables may, of course, be fed into the chutes by hand or, preferably, by conventional automatic feeding devices such as hoppers or conveyors.

A machine designed in accordance with the present invention is capable of handling up to five thousand pounds of potatoes per hour at a speed of 400 revolutions per minute. At this speed approximately 2400 cuts per minute are produced of uniform thickness. When waffle-type blades are used, each slice is uniformly apertured, easily cooked and pleasing in appearance.

Having thus described the several useful and novel features of the present invention, it will be seen that the several useful objects for which it was designed have been achieved. Although but a single specific form of the vegetable slicing machine has been illustrated, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. In a vegetable slicing machine of the type having a housing with a vegetable receiving aperture therein and a disk carrying a cutter mounted for rotation behind the aperture, the feed mechanism that comprises an open-topped chute attached to the housing in position to direct a vegetable placed therein through the aperture and against the cutter, said chute having two generally-triangular shaped sidewalls diverging from a common edge inclined at an angle between approximately 30° and 40° to the plane of the disk carrying the cutter, and water-jet means located above the chute positioned and adapted to direct a stream of water against a vegetable in the chute thereby forcing said vegetable against the cutter.

2. The device as set forth in claim 1 in which the sidewalls of the chute intersect along their common edge at an included angle of not less than approximately 90°.

References Cited in the file of this patent

UNITED STATES PATENTS

| | | |
|---|---|---|
| 2,567,248 | Stahmer | Sept. 11, 1951 |
| 2,644,500 | Stahmer | July 7, 1953 |
| 2,763,305 | Scheckler | Sept. 18, 1956 |
| 2,769,714 | Stahmer | Nov. 6, 1956 |
| 2,807,302 | Qualheim | Sept. 24, 1957 |